T. SLOPER.
WIND SHIELD FOR WHEELS.
APPLICATION FILED SEPT. 29, 1916.
1,223,743.   Patented Apr. 24, 1917.
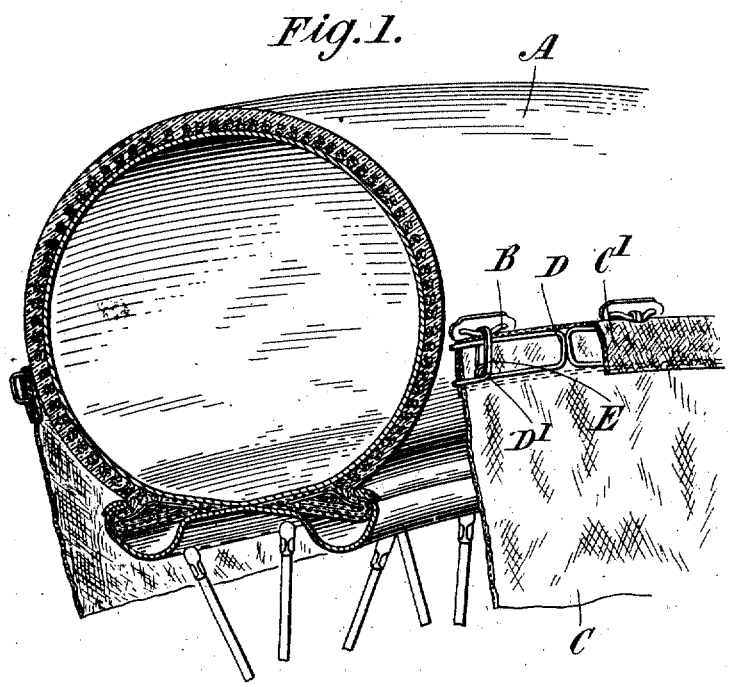
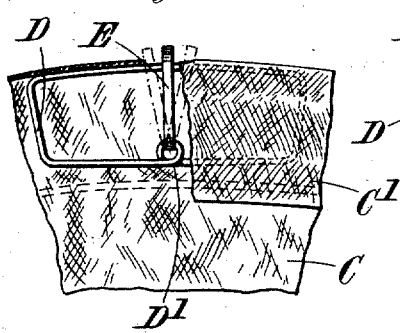
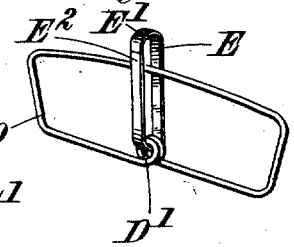
Witnesses
Jesse B. Heller.
W. C. Lyon
Inventor
Thomas Sloper
by Bakewell, Byrnes & Parmelee
Attys

UNITED STATES PATENT OFFICE.

THOMAS SLOPER, OF WILTSHIRE, ENGLAND.

WIND-SHIELD FOR WHEELS.

1,223,743.

Specification of Letters Patent.

Patented Apr. 24, 1917.

Application filed September 29, 1916. Serial No. 122,831.

*To all whom it may concern:*

Be it known that I, THOMAS SLOPER, a subject of the King of England, residing at Wiltshire, England, have invented certain new and useful Improvements in Wind-Shields for Wheels, of which the following is a specification.

This invention is for improvements in or relating to wind-shields for wheels and is particularly applicable to aeroplane wheels which, as is well-known, are required to offer as little wind resistance as possible. The shield is preferably of canvas or other flexible material and is of the type described in the specification of my earlier Patent No. 1167124 dated 4th January 1916 "wind shields". In this earlier patent specification the shield is described as made in the form of a disk and connected by spring-controlled hooks to the rim of the wheel which is provided with perforations to receive the hooks. It is found that the wheel offers considerably less wind resistance if the shields, instead of extending from the rim to the center of the wheel, extend from the sides of the tire to the center of the wheel, but difficulty has been experienced in providing a connecting means between the tire and shield whereby the shield can be readily connected and disconnected and yet securely fastened to the tire.

When hooks such as are described in my earlier patent specification were engaged with fastenings in the tire, it was found that the hooks and the fastenings tended to tear away through the action of the tire when the aeroplane wheel struck the ground or when it was running on the ground. The distortion of the tire at such times is considerable, and therefore it is necessary to provide some connection which allows considerable free movement of the fastenings on the tire relatively to the periphery of the shield with which such fastenings are connected.

According to this invention there is combined with a disk-like wind-shield for a pneumatically tired wheel, peripherally disposed links for connecting the shield by its edge to fastenings secured in the side of the tire, which links are so connected to the shield and to the said fastenings that they can swing freely in the circumferential direction of the wheel for the purpose of enabling the shield to accommodate itself to distortions of the tire without the tire fastenings or links being torn away.

Preferably the link is itself rigid but can swing about its connection to the shield and about the fastening to the tire. It may be made in the form of a hook whereof the shank-end is an eye which is connected, say, to a spring fastening in the periphery of the shield, and the other end has a spring tongue to allow engagement with, but which closes against accidental disengagement from, the fastening in the tire.

In the accompanying drawings which illustrate one method of carrying out this invention—

Figure 1 is a perspective view showing a portion of a pneumatic tire and wheel-rim with part of a shield attached to it;

Fig. 2 shows in elevation a portion of the shield on a larger scale than Fig. 1, the shield being broken away to show clearly the spring fastenings within it to which the links are attached, and Fig. 3 is a perspective view of one of the spring fastenings of the shield with the link thereon.

The same letters indicate the same parts throughout the drawings.

The tire A has secured on each side a series of wire fastenings B. These are placed on each side near that portion which extends out to the greatest lateral limit, or they may be placed right along the line of greatest lateral projection. The shield C is a disk either flat or conical in form and may be of canvas. It is provided with a peripheral pocket $C^1$ in which a series of spring fastenings D are mounted. Each fastening is made from resilient wire bent into the form of an elongated loop, the two ends being made to meet at $D^1$. This point of meeting is approximately midway along the length of the loop and is on the side which is remote from the extreme edge of the peripheral pocket $C^1$. The ends are both bent to form an eye which receives the shank end of a spring link E. The link is conveniently formed of flat wire bent into a loop, one end of the wire constituting a hook $E^1$ at one end of the loop and the other end of the wire being made to constitute a spring tongue $E^2$ the end of which lies opposite the end of the hook and thus obstructs access to and from the hook. That end of the loop which is remote from the hook end constitutes a shank which is engaged with the loops $D^1$ on the spring fastenings D. Each link E is made long enough to embrace and extend beyond the side of the spring fastening which lies against the extreme edge of the pocket $C^1$ of the shield and the link can swing freely in the circumferential direction of the shield or wheel; in Fig. 2 the position to which the link can swing in each direction is indicated in dotted lines.

The dimensions of the shield C are such that when secured in place, the links E are under tension and the ends $D^1$ of the spring fastenings D are under compression, that is to say, the free ends $D^1$ are forced slightly toward the outer edge of the pocket $C^1$ of the shield. The links E are engaged with the fastenings B by springing back the tongue $E^2$ so that the hook $E^1$ can engage the fastening, and the spring tongue $E^2$ then resumes its position in alinement with the end of the hook $E^1$ and prevents accidental detachment.

When the tire A is distorted either by running upon the ground, or as when striking the ground during the landing of the aircraft, the freedom of the links E to move about the eyes $D^1$ in the circumferential direction of the wheel and also their freedom to swing about the fastenings B, allows considerable relative displacement of the tire and shield without such strain being put upon the spring fastenings D or the tire fastenings B as to tear them out of place.

The form of fastening described in my earlier Patent No. 1167124 already referred to, allowed for no movement between the hook and the spring fastening except such as would result from the yielding of the hook and fastening combined which were formed as an integral piece from resilient wire. This in some cases is not found to be sufficient to prevent the tire fastenings from being torn out of the tire or the spring fastenings out of the shield. The free movement of the links E, which take the place of the hooks in the fastening described in my earlier patent specification, obtained by connecting the link to the spring fastening in such manner that it can swing relatively to the spring fastening, is found to prevent the tearing away of the connected parts.

The advantage of situating the yielding side of the spring fastenings $D^1$ on that side of each fastening farthest from the periphery of the shield is that it enables the portion of each link which protrudes from the shield to be kept short though the link itself can thus be made long enough to permit its easy operation. If the portion of the link which protrudes from the shield is too long it tends to leave a gap between the tire and the shield which causes eddy currents when passing through the air.

It will be appreciated that the tire and shield connected as described are subject to relative local movements due to the distortion of the tire, which movements are both radial and circumferential. The radial movement is compensated for by the spring-fastenings, and the object of the links is to provide for the circumferential movements. The invention is not restricted to any particular form of spring-fastening and the links may be variously formed so long as they allow the necessary free circumferential movement within given limits; for instance, instead of being rigid links swinging by means of a hinging action on the tire-fastenings and spring-fastenings, they may be flexible links which may swing freely by reason of their flexibility whether they hinge or not on the tire-fastenings and spring-fastenings.

What I claim as my invention and desire to secure by Letters Patent is:—

1. In a wind-shield for a wheel the combination of a shield of flexible material shaped to cover the side of the wheel and of a diameter less than the combined diameter of the wheel and tire, links secured to the shield around the periphery in such manner that they can swing in the circumferential direction of the shield, and fasteners on the side of the tire to receive those ends of the links which project beyond the shield, the connection between the links and fasteners being such that the links can swing relatively to them in the circumferential direction of the shield, substantially as and for the purpose set forth.

2. In a wind-shield for a wheel the combination of a shield of flexible material shaped to cover the side of the wheel and of a diameter less than the combined diameter of the wheel and tire, a series of rigid links disposed around the periphery of the shield and each connected thereto by one end in such manner that it can swing in the circumferential direction of the shield, and fasteners on the side of the tire which engage the other ends of the links in such manner that they can swing on the fasteners in the circumferential direction of the shield, substantially as and for the purpose set forth.

3. In a wind-shield for a wheel the combination of a shield of flexible material shaped to cover the side of the wheel and of a diamter less than the combined diameter of the wheel and tire, a series of resilient fastenings secured to the periphery of the shield, a link connected to each fastening in such manner that the link projects beyond the periphery of the shield and can swing in the circumferential direction of the same, and fastenings on the side of the tire to receive the projected ends of the links, the connection being such that the links can swing on the fastenings in the circumferential direction of the shield, substantially as and for the purpose set forth.

4. In a wind-shield for a wheel the combination of a shield of flexible material shaped to cover the side of the wheel and of a diameter less than the combined diameter of the wheel and tire, a series of fastenings disposed in a peripheral pocket in the shield, each fastening being of wire bent to provide a broad thrusting face against the peripheral edge of the pocket, the two ends of the wire being bent inward toward the center of the shield and then toward each other to provide a resilient portion, links connected each by one end to the resilient portion provided by the fastenings in the shield, the connection between these fastenings and the links being such that the latter can swing in the circumferential direction of the shield and fastenings on the side of the tire to receive the ends of the links which project from the shield, the connection between those fastenings and the links also being such that the links can swing in the circumferential direction of the shield, substantially as and for the purpose set forth.

In testimony whereof I have signed my name to this specification in the presence of two subscribing witnesses.

THOMAS SLOPER.

Witnesses:
HAROLD PARSONS,
EDWARD KNIVETON.